Aug. 5, 1952     H. J. LIPKIN     2,606,282
PULSE TRANSPONDER
Filed July 9, 1945     2 SHEETS—SHEET 1
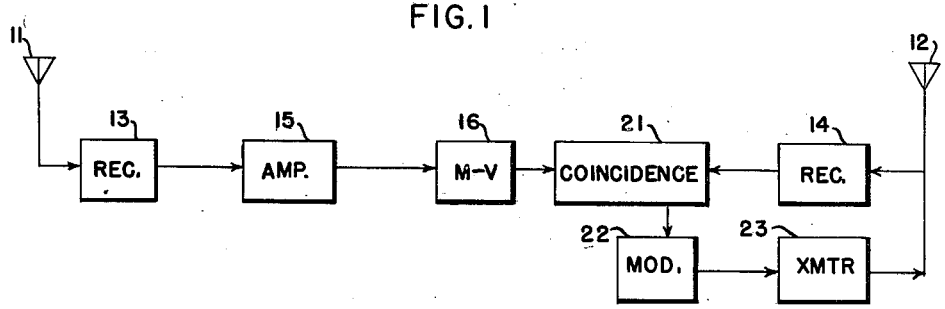
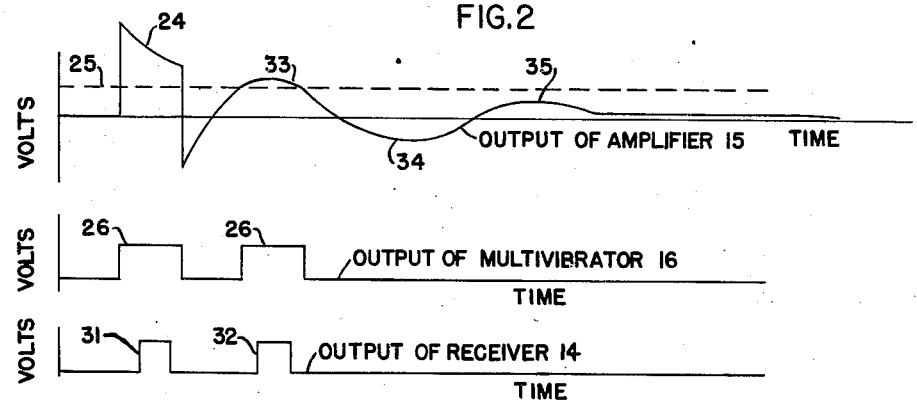
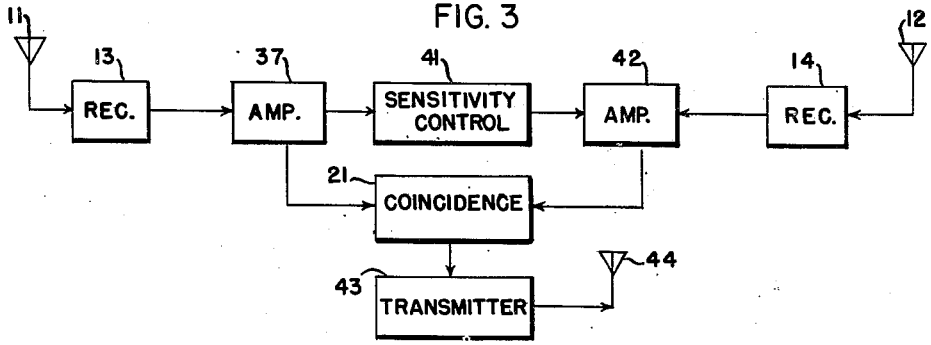
INVENTOR
HARRY J. LIPKIN
BY
ATTORNEY Aug. 5, 1952  H. J. LIPKIN  2,606,282
PULSE TRANSPONDER
Filed July 9, 1945  2 SHEETS—SHEET 2

INVENTOR
HARRY J. LIPKIN
BY
ATTORNEY

Patented Aug. 5, 1952

2,606,282

UNITED STATES PATENT OFFICE 2,606,282

PULSE TRANSPONDER

Harry J. Lipkin, Dorchester, Mass., assignor, by mesne assignments, to the United States of America as represented by the Secretary of War Application July 9, 1945, Serial No. 604,050

6 Claims. (Cl. 250—15)

This invention relates to communication systems and more particularly to navigational and identification systems operating in conjunction with radar or radio object-locating equipment.

According to conventional practice certain apparatus is placed in aircraft, ships, or at known land stations for navigational or identification purposes. These devices are generally known as beacons when used for navigation and as transponders when used for identification purposes. Such devices are set into operation or interrogated by another device generally known as an interrogator which transmits an interrogating signal to it. The signal transmitted from the beacon or transponder, hereinafter referred to as the beacon, may be at the frequency of the received signal or at some new frequency. Improvements have been made in these systems so that transmission will occur from the beacon only when two signals of different frequency are received thereat which bear a predetermined time relationship to each other. One of the two signals transmitted to the beacon is normally of a relatively low frequency and transmitted from a nondirectional antenna. The other transmitted signal is generally at a relatively high frequency and transmitted from a highly directional antenna. However, as is well understood in the art, the highly directional antenna will have some undesirable side lobes. When the distance between the interrogator and the beacon is short, these side lobes may be of sufficient magnitude to actuate the beacon. This then causes a highly undesirable broadening of the search angle through which the beacon responds. Such broadening of the response arc or increased arc width as it is sometimes called is objectionable for several reasons. Primarily it obscures the true azimuth of the beacon, and secondarily it produces "clutter" on the indicator at the interrogator station.

An object of the present invention is, therefore, to provide an improved beacon in which the arc width may be controlled from the interrogator station.

Another object of the present invention is to provide an improved beacon in which the arc width is automatically controlled by the beacon itself.

For a better understanding of the invention, together with other and further objects thereof, reference is had to the following description taken in connection with the accompanying drawings in which:

Fig. 1 is a block diagram of a beacon whose response arc may be controlled at the interrogator station;

Fig. 2 shows certain waveforms pertinent to the beacon of Fig. 1;

Fig. 3 is a block diagram of an improved beacon in which the response arc is automatically controlled at the beacon;

Figure 4:
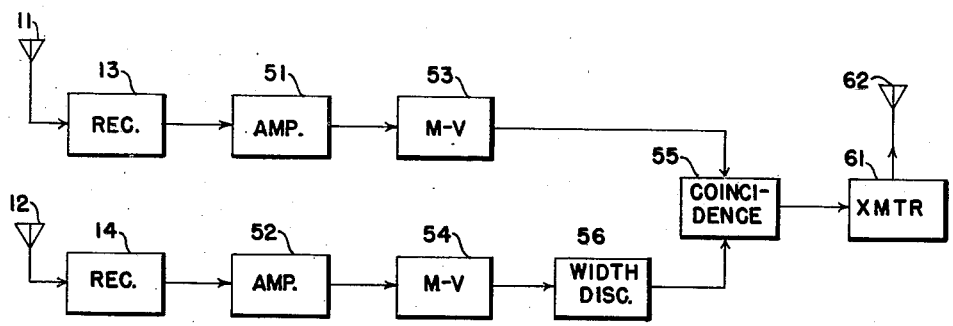
Fig. 4 is a block diagram of another embodiment of a beacon in which the response arc is automatically controlled at the beacon.

Referring now to Fig. 1 of the drawings, there is shown an improved beacon which comprises antennae 11 and 12 which feed receivers 13 and 14 respectively. Receiver 13 drives a video amplifier 15 which in turn controls a multivibrator 16.

The term video amplifier denotes an amplifier capable of amplifying a very wide band of frequencies, including and exceeding the audio band of frequencies.

The receiver 14 and multivibrator 16 drive a coincidence circuit 21 which controls a modulator 22. The coincidence circuit 21 may be any conventional circuit which responds to two signals coincidently applied thereto to produce an output therefrom. The modulator 22 controls a transmitter 23 which may be caused to transmit as shown on antenna 12. It will be realized, of course, that the transmitter 23 may operate at any desired frequency and, therefore, may or may not use the antenna 12. The invention should not, therefore, be construed as being so limited. In Fig. 2 waveform 24 shows the output voltage of the video amplifier 15. The waveform 24 may be produced by a conventional resistance-capacitance coupled video amplifier by having impressed upon the input thereof a pulse having a substantially rectangular waveform, provided the time constants of the coupling circuits are properly adjusted. The voltage level 25 in Fig. 2 indicates the voltage level which must be attained before the multivibrator 16 will be actuated. Waveform 26 of Fig. 2 indicates the output of the multivibrator 16 as applied to the coincidence circuit 21 upon reception of a signal by antenna 11 of sufficient amplitude to produce voltage waveform 24. Waveforms 31 and 32 indicate two possible positions in time of a signal received by receiver 14 which may be applied to the coincidence circuit 21 in coincidence with signals from the multivibrator 16.

In the operation of the circuit of Fig. 1, a signal received by antenna 11 and receiver 13 causes the video amplifier to have an output waveform such as shown by waveform 24 in Fig. 2. It can be shown that the amplitude of the overshoots indicated by 33, 34 and 35 are functions of the amplitude of the received signal. Each time the waveform 24 exceeds the voltage level 25 the multivibrator 16 is actuated and produces an output pulse such as shown by waveform 26 in Fig. 2. By adjusting the time of occurrence of the second received signal at the interrogator station, the position 31 or 32 of the output pulse from receiver 14 may be made to coincide with either the first or second output pulse from multivibrator 16, waveform 26. Thus, we see that if the second transmitted pulse occurs at a time such as to produce the pulse 32, the modulator 22 and hence the transmitter 23 will be actuated only when the first received signal is of sufficient amplitude to cause the overshoot 33 to exceed the threshold level 25. It will be obvious to those skilled in the art that the second transmitted pulse may be delayed still further if desired and thus actuate the modulator and transmitter when overshoot 35 crosses the threshold voltage 25 on stronger received signals. Thus by properly delaying the time of the second received signal, we can prevent actuation of the transmitter 23 in the relatively weak side lobes and produce actuation only on the main lobe and in this manner control the arc width of the beacon response.

Referring now to Fig. 3, there is shown an improved beacon which has automatic arc width control. This circuit comprises antennas 11 and 12 similar to antennas 11 and 12 of Fig. 1 which drive receivers 13 and 14 also similar to receivers 13 and 14 of Fig. 1. The receiver 13 drives a video amplifier 37 which in turn feeds a coincidence circuit 21 and a sensitivity control circuit 41. The receiver 14 feeds a video amplifier 42, the sensitivity of which is controlled by the control circuit 41. The video amplifier 42 also feeds the coincidence circuit 21. The coincidence circuit actuates a transmitter 43 which transmits from an antenna 44. The antenna 44 may in actuality be antenna 11 or 12 if the transmitting frequency coincides with the frequency of one of the received signals.

In the operation of this circuit the antenna 11 is a nondirectional antenna and receives its signal from a nondirectional antenna at the interrogator station. Because of the nondirectional properties of the antenna, the amplitude of the output of the receiver 13 and video amplifier 37 is an indication of the distance between the interrogator and the beacon and is not a function of the search angle of the directional antenna at the interrogator. As stated above, the output of the amplifier 37 is fed to the coincidence circuit 21 and also to the sensitivity control circuit 41. The control 41 determines the sensitivity of the amplifier 42 in accordance with the amplitude of the first received signal. The second received signal of antenna 12 of receiver 14 will generally be from a highly directional antenna at the interrogator station and its amplitude will be a function of the search angle at the interrogator. Since all signals will increase in amplitude as the beacon and interrogator approach each other, the side lobes from the second transmitted signal would normally actuate the beacon. However, because of the effect of the sensitivity control circuit 41, the sensitivity of the video amplifier 42 may be reduced to such a point as to prevent the beacon being actuated by the side lobes. Thus there is provided an automatic means for controlling the arc width.

Figure 5:
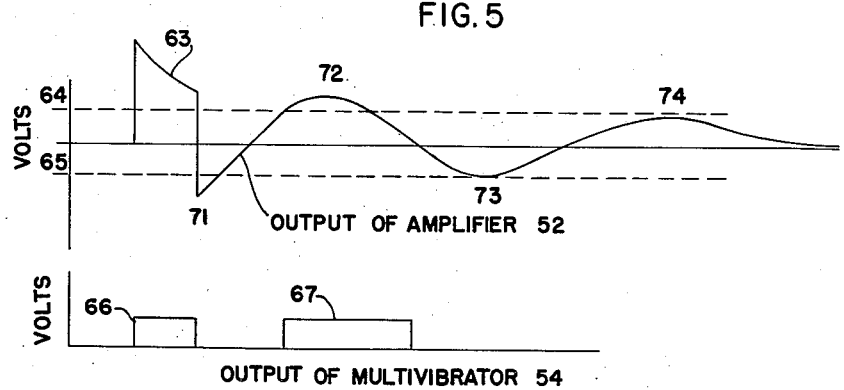
Fig. 5 shows certain waveforms pertinent to the beacon of Fig. 4.

Referring now to Fig. 4 of the drawings, there is shown another embodiment of a beacon which automatically controls the arc response. It comprises antennas 11 and 12 which feed receivers 13 and 14 respectively. The receivers 13 and 14 drive video amplifiers 51 and 52 which in turn drive multivibrators 53 and 54. The multivibrator 53 feeds a coincidence circuit 55. The multivibrator 54 feeds its output to the coincidence circuit 55 through a pulse width discriminator circuit 56. The coincidence circuit 55 controls the operation of the transmitter 61 which drives an antenna 62. As before, the antenna 62 may in actuality be antenna 11 or antenna 12. The waveform 63 in Fig. 5 illustrates the output of the video amplifier 52. As described in the discussion relating to Fig. 1, this output waveform is accomplished by the use of coupling circuits in the video amplifier 52 which have short time constants. The voltage level 64, Fig. 5, indicates the voltage level which the voltage 63 must exceed to actuate the multivibrator 54. The voltage level 65 indicates the voltage below which voltage 63 will cause the multivibrator 54 to be deactuated. The waveforms 66 and 67, Fig. 5, indicate the output of the multivibrator 54 when a voltage of waveform such as 63 is applied to the input of the multivibrator 54.

In the operation of this circuit the first received signal from the nondirectional antenna at the interrogator will be received by antenna 12 and receiver 14. The resulting output from the amplifier 52 will be as shown by waveform 63, Fig. 5. The amplitude of the overshoots 71, 72, 73 and 74 depends upon the amplitude of the first received signal. If the interrogator and beacon are sufficiently close to each other so that the side lobes from the highly directional antenna would normally actuate the beacon, the signal from the nondirectional antenna will be of sufficient amplitude to cause the waveform 63 to overshoot or drop below the threshold value 65 at 71. This causes the multivibrator 54 to produce an abnormally short pulse such as indicated by 66 in Fig. 5. This pulse 66 being narrower than normal does not pass through the pulse width discriminator 56. However, the overshoot 72 again turns on the multivibrator 54, and since the overshoot 73 does not recross the threshold value 65, the multivibrator 54 produces a normal pulse as indicated by waveform 67. This normal pulse, waveform 67, passes through the discriminator 56 to the coincidence circuit 55. The second received pulse from the highly directional antenna is received by antenna 11 and receiver 13 and fed to amplifier 51. The output of the video amplifier 51 will be similar in waveform to the waveform 63 of Fig. 5 and the multivibrator 53 will be actuated when the voltage 63 exceeds the level 64. Note, however, that whereas the first received signal excites the coincidence circuit 55 with waveform 67, the second received signal can excite the coincidence circuit 55 at the same time only if the second received signal is very strong. The threshold value of multivibrator 53 can be so adjusted that this restriction will eliminate actuation of the coincidence circuit 55 by side lobes. Hence, there is afforded a beacon which automatically controls the arc response. It should be noted also that the transmitted signal from transmitter 61 and antenna 62 will be delayed after the time of reception of both the first and second received signals by an amount which depends upon the amplitude of the first and second received signals, and hence upon the proximity of the interrogator and the beacon.

While there have been described what are at present considered the preferred embodiments of the invention, it will be obvious to those skilled in the art that various changes and modifications may be made therein without departing from the invention.

What is claimed is:

1. A communication system comprising first and second antennas, first and second receivers communicating respectively with said first and second antennas, amplifier means connected to the output of said first receiver for producing a plurality of output signals in response to an input signal having an amplitude greater than a predetermined value, a multivibrator adapted to be actuated by said amplifier means, transmitting means, modulating means connected to said transmitting means in such a manner as to control the transmission therefrom, and means for exciting said modulating means in response only to the coincident occurrence of outputs from said multivibrator and said second receiver.

2. A communication system comprising first and second antennas, first and second receivers communicating respectively with said first and second antennas, first and second amplifier means for producing a plurality of output signals in response to an input signal having an amplitude greater than a predetermined value respectively connected to the outputs of said first and second receivers, first and second multivibrators adapted to be respectively actuated by said first and second amplifier means, pulse width discriminator means connected to the output of said first multivibrator for eliminating pulses having less than a predetermined duration, radio transmitting means, and means connected to said transmitting means for causing transmission therefrom in response only to the coincident occurrence of outputs from said pulse width discriminator means and second multivibrator.

3. A communication system comprising first and second antennas, first and second receivers connected respectively with said first and second antennas, an amplifier means for producing a plurality of pulses in response to a strong input pulse connected to the output of said first receiver, radio transmitting means, a pulse coincidence determining circuit having an input connection to said amplifier means and an input connection to said second receiver and an output connection to said transmitting means for exciting said transmitting means in response to coincident pulses impressed on said coincidence circuit by said amplifier means and said second receiver.

4. A transponder for transmitting a signal in response to the interception thereby of a non-directionally radiated signal and the main lobe of the radiation pattern of a directionally radiated signal, said transponder comprising first and second pulse receivers, first means connected to the output of said first receiver for producing a plurality of output pulses in response to an input pulse having an amplitude greater than a predetermined value, a radio transmitter, a pulse coincidence determining means having input connections to said first means and said second receiver and an output connection to said radio transmitter for exciting said transmitter in response only to coincidence between a selected one of said output pulses and a pulse impressed on said coincidence determining means by said second receiver.

5. The transponder defined in claim 4 wherein said first means includes an amplifier for producing a plurality of oscillations in response to an input pulse of a given amplitude, and a multivibrator connected to said amplifier and adapted to be triggered on and off by said oscillations.

6. The transponder defined in claim 5 including means connecting said multivibrator and said coincidence determining means for eliminating pulses having less than a predetermined duration.

HARRY J. LIPKIN.

REFERENCES CITED

The following references are of record in the file of this patent:

UNITED STATES PATENTS

| Number | Name | Date |
|---|---|---|
| 1,607,837 | Martin | Nov. 23, 1926 |
| 1,934,211 | Schroter et al. | Nov. 7, 1933 |
| 2,034,738 | Beverage | Mar. 24, 1936 |
| 2,125,977 | Zworykin | Aug. 9, 1938 |
| 2,155,821 | Goldsmith | Apr. 25, 1939 |
| 2,292,222 | Haigis | Aug. 4, 1942 |